US007610311B2

(12) United States Patent
Park et al.

(10) Patent No.: US 7,610,311 B2
(45) Date of Patent: Oct. 27, 2009

(54) METHOD FOR QUANTIFYING PLANT RESOURCES USING GIS

(75) Inventors: Gwang Woo Park, Seoul (KR); Young Han Kwon, Jinjoo-si (KR); Kyoung Choi, Seoul (KR); Seung Hwan Oh, Seoul (KR); Sang Hee Shin, Seoul (KR); Dong Jin Kang, Anyang-si (KR)

(73) Assignee: National Arboretum, Korea Forest Service, Pocheon-Si, Gyeonggi-Do (KR)

( * ) Notice: Subject to any disclaimer, the term of this patent is extended or adjusted under 35 U.S.C. 154(b) by 384 days.

(21) Appl. No.: 11/561,200

(22) Filed: Nov. 17, 2006

(65) Prior Publication Data

US 2007/0124335 A1 May 31, 2007

(30) Foreign Application Priority Data

Nov. 29, 2005 (KR) ...................... 10-2005-0114531

(51) Int. Cl.
*G06F 7/00* (2006.01)
(52) U.S. Cl. .................................................. 707/104.1
(58) Field of Classification Search ................... 707/104
See application file for complete search history.

(56) References Cited

U.S. PATENT DOCUMENTS

| 7,243,459 | B2 * | 7/2007 | Kaprielian | ............... 47/1.01 R |
| 7,400,975 | B2 * | 7/2008 | Glenn et al. | ................... 702/2 |
| 2002/0170229 | A1 * | 11/2002 | Ton et al. | ....................... 47/1.7 |

FOREIGN PATENT DOCUMENTS

KR  10-2005-0098500  10/2005

OTHER PUBLICATIONS

Louis R. Iverson, Martin E. Dale, Charles T. Scott and Anantha Prasad; A GIS-derived integrated moisture index to predict forest composition and productivity of Ohio forests (U.S.A.); 1997 Kluwer Academic Publishers. Printed in the Netherlands; p. 1-18.*
Elaine Kennedy Sutherland and Todd F. Hutchinson; Characteristics of Mixed-Oak Forest Ecosystems in Southern Ohio Prior to the Reintroduction of Fire; Published by: USDA Forest Servic, 11 Campus Blvd Suite 200, Nwetown Square PA 19073-3294; Jan. 2003; p. 1-165.*

* cited by examiner

*Primary Examiner*—John R. Cottingham
*Assistant Examiner*—Mohammed R Uddin
(74) *Attorney, Agent, or Firm*—Lowe Hauptman Ham & Berner, LLP (57) ABSTRACT

A method for quantifying plant resource using a GIS is disclosed, in which it is possible to more efficiently quantify plant resources with less manpower, time and cost using a GIS when quantifying plant resources in a certain region. In the method, a sample group is extracted from mother groups having a plurality of distribution maps having a plurality of environment factors including IMI as attribute data, the IMI being obtained through a GIS preprocess. A relative model formula is obtained between a plant resource real measurement value of the sample group and an environment factor real measurement value and is related with the distribution map of the mother group, and the distribution maps are overlapped for thereby forming a plant resource estimation distribution map of the mother group.

13 Claims, 5 Drawing Sheets

Figure 1

Prior Art

METHOD FOR QUANTIFYING PLANT RESOURCES USING GIS

CROSS REFERENCE

Applicant claims foreign priority under Paris Convention and 35 U.S.C. § 119 to the Korean Patent Application No. 10-2005-0114531, filed Nov. 29, 2005 with the Korean Intellectual Property Office.

TECHNICAL FIELD

The present invention relates to a method for quantifying plant resources using a GIS (Geographic Information System), and in particular to a method for quantifying plant resources using a GIS in which a plant resource is quantified through a plant resource estimation distribution diagram based on an environment factor including a wetness index using a GIS.

BACKGROUND ART

Here, in the past a plant resource may be referred to a wood resource formed of trees in a forest field, while having been developed based on a promotion and management of a wood resource. However, in the modern times, the definition of a plant resource have changed to including shrub, herbs and moss as the use of an extract or gene resource of the above materials increases in addition to a wood resource.

No system for efficiently managing the plant resources including the above definitions is disclosed. As a GIS is developed under the name of a cyber nation management in KOREA, there are provided a NGIS (National GIS) which has a nationwide geographic data, and a FGIS (Forestry GIS) which has a comprehensive data concerning a nationwide forest area (6,400,000 ha).

The GIS is designed to basically process a spatial geographic data having a distribution characteristic and to digitalize the same for thereby forming a digital map. As a GIS source material for computing a geographic data, there are a digital topographic map, a digital forest physiognomy map, a forest site map, an ecology nature map, etc. Here, the digital topographic map contains a shape, high and low and curve of a ground surface, a water flow, a road and railroad, a position of a village, etc. The digital forest physiognomy map contains a forest physiognomy, a diameter class, an age class, and a crown density. The forest site map contains a soil texture, an effective soil depth, etc. The ecology nature map contains a national park boundary.

The above source materials of the GIS are classified in the same manner as the reduced-scaled map piece classification system of a paper topographical map. The above contents will be described in more details with reference to FIG. 1.

Figure 1:
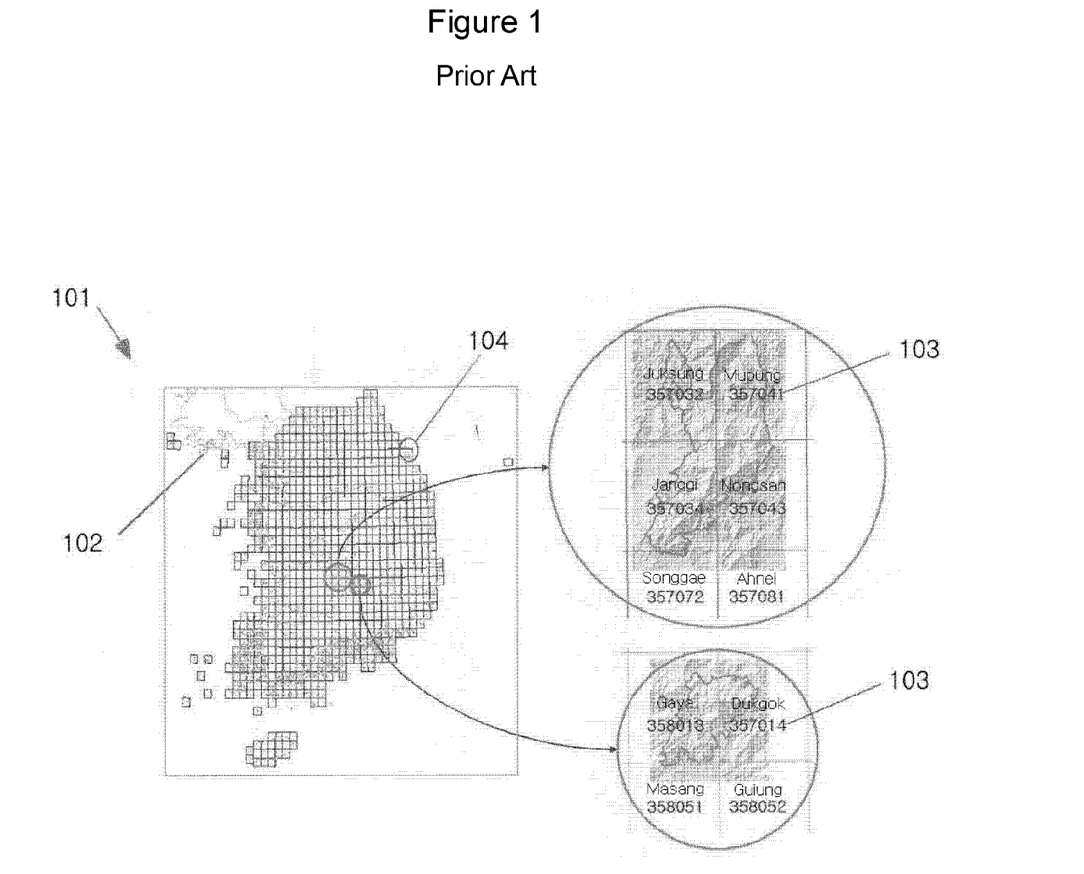
FIG. 1 is a plane view partially illustrating a conventional GIS.

FIG. 1 is a plane view partially illustrating a conventional GIS.

As shown in FIG. 1, the GIS 101 is referred to a material system which supports a decision by providing a function such as an input, modification, process, output and analysis concerning a spatial data and an attribute data. Here, the object processed by the GIS 101 is a spatial geographic data having a certain distribution characteristic. The GIS 101 is formed in such a manner that various geographic data are shown on a map 102. The geographic data is expressed with reference numerals 103. For more complete geographic data, there should be provided a spatial data divided by the map piece 104 and an attribute data formed of a plurality of layers.

The spatial data represents a spatial relative position relationship between the positions and shapes of various geographies and mapping and is expressed with dots, lines, and surfaces on the map. The attribute data is expressed with the characteristics of geographic mapping on various coordinates shown with dots, lines and surfaces.

For example, assuming that a certain ground surface space indicated with one dot is a soil quality control center, the above position is converted into a spatial material in a form of a pair of coordinates X and Y, and the attribute data is expressed with a name and symbol of the soil quality control center, a BOD or a DO which are measured at a certain time. A linear material such as a road is expressed with a series dot, and an attribute data such as a road name, road width, road surface material, traffic level, etc. are expressed with a character or number and are stored in a database. An administrative section map and soil map formed in polygonal shapes or surface material are processed in a form of a spatial data using a closed curve formed of multiple line segments. The above attribute data is formed of population or soil characteristics of each region divided by a closed curve.

In the conventional art, the data concerning a plant resource stored in the GIS is formed of only a data concerning a wood resource. So, it is advantageously needed to construct a data concerning wider ranges of plant resources. A certain method for constructing the above data is needed.

So as to construct the data concerning wider ranges of plant resources, it is needed to survey with respect to nationwide plant resources. The surveyed plant resource values are added to the attribute data of the GIS. In addition, a certain management system is needed to update the above materials at regular intervals and to resurvey the disappeared plant resources and to manage the constructed plant resources. Lots of costs and time are needed so as to construct and manage the data concerning the wider range plant resources.

DISCLOSURE OF INVENTION

Accordingly, it is an object of the present invention to provide a method for quantifying plant resources using a GIS which overcomes the problems encountered in the conventional art.

It is another object of the present invention to provide a method for quantifying plant resources using a GIS which is capable of easily recognizing the number and distribution of plant resources of wider regions with less manpower, time and cost.

It is further another object of the present invention to provide a method for quantifying plant resources using a GIS in which plant resources can be efficiently surveyed and analyzed using a GIS.

It is still further another object of the present invention to provide a method for quantifying plant resources using a GIS in which it is possible to manage the constructed data of the plant resource in real time.

It is still further another object of the present invention to provide a method for quantifying plant resources using a GIS in which an estimated value of a plant resource concerning a certain region may be computed using the constructed data of the plant resources.

To achieve the above objects, there is provided a method for quantifying a plant resource using a GIS which comprises a first step in which a sample group is extracted from mother groups having a plurality of distribution maps having a plurality of environment factors as attribute data, each environment factor including an IMI (Integrated Moisture Index) obtained through a GIS preprocess, so that a first relative table between a plant resource real measurement value of the sample group and an environment factor real measurement value is formed; a second step in which a second relative table is formed for thereby obtaining a relative model formula between the plant resource real measurement value and the environment real measurement value with respect to a certain species of a plant by relating the first relative table with a statistic analysis program; and a third step in which a plant resource estimation distribution map of the mother group having a plant resource estimation value as an attribute data is formed by relating the second relative table with the distribution map of the mother group and overlapping the distribution maps.

The distribution maps are formed in three dimensional raster types so that they can be computed with each other through an overlapping.

The environment factors are 13 factors formed of altitude, azimuth and slope, which represent geographic factors; forest physiognomy, diameter class, age class and crown density which represent upper level plants; soil texture, site index and soil depth which represent soil factors; approaching characteristic which represents an artificial confusing factor; a daily available accumulated light intensity which represents a light factor; and an IMI, and the IMI is obtained through four factors formed of hill shade, flow accumulation, and curvature which represent geographic factors; and total available water-holding capacity which represents soil factor.

The total available water-holding capacity (t) is obtained by the formula of "total available water-holding capacity(t)= effective soil depth×(1/soil drainage)".

The GIS preprocess step comprises a digital geographic map preprocess step in which a plurality of distribution maps are formed, each map having altitude, azimuth, slope, approaching characteristic, hill shade, flow accumulation and curvature as an attribute data; a digital forest physiognomy map preprocess step in which a plurality of distribution maps are formed, each map having forest physiognomy, diameter class, age class and crown density as an attribute data; a forest site map preprocess step in which a plurality of distribution are formed, each map having soil texture, site index, effective soil depth and total available water-holding capacity as an attribute data; and a survey time-based summer solstice accumulated light intensity preprocess step in which one distribution map is obtained, which has a daily available accumulated light intensity as an attribute data.

According to the method for quantifying plant resources using a GIS, the IMI distribution map forming method having the IMI as an attribute data comprises a step (a) in which four distribution maps are formed, each map having hill shade, flow accumulation, curvature and total available water-holding capacity as an attribute data; a step (b) in which a moisture weighting value is adapted with respect to the attribute data values of four distribution maps; and a step (c) in which the IMI distribution map is generated as the attribute data values corresponding to the same places as four distribution maps are overlapped are computed with each other.

The IMI is computed based on the formula of "IMI=(h× W1)+(f×W2)+(c×W3)+(t×W4)", where h represents the value of hill shade, f represents the value of flow accumulation, c represents the value of curvature, t represents the value of total available water-holding capacity, W1 represents moisture weighting value with respect to the hill shade, W2 represents moisture weighting value with respect to flow accumulation, W3 represents moisture weighting value with respect to curvature, and W4 represents moisture weighting value with respect to total available water-holding capacity.

According to the method for quantifying plant resources using a GIS, plant resource corresponds to a plant species-based individual population and a plant species-based growth.

In the first step according to the present invention, the first relative table is formed by inputting a plant resource real measurement value of the sample group obtained through a corresponding site survey and an environment factor real measurement value.

In the second step according to the present invention, a relative model formula is obtained for determining a plant resource estimation value based on the environment factor real measurement value using a logistic regression analysis program with a statistic analysis program, and a result of the above process allows a second relative table to be formed.

In the method for obtaining a relative model formula, the relative model formula is obtained in such a manner that an analysis between the environment real measurement values is performed based on the logistic regression analysis program, and 13 relative relationship coefficients representing a relative relationship with respect a species of one plant between 13 factors are obtained, and 13 relative relationship coefficients are adapted to the relative model formula through an analysis between the environment factor real measurement value and the plant resource real measurement value.

Here, the relative model formula is expressed in the formula of "$Y = A + A1(X_{altitude}) + A2(X_{azimuth}) + A3(X_{slope}) + A4(X_{forest\ physiognomy}) + A5(X_{diameter\ class}) + A6(X_{age\ class}) + A7(X_{crown\ density}) + A8(X_{soil\ texture}) + A9(X_{soil\ site}) + A10(X_{effective\ soil\ depth}) + A11(X_{approaching\ characteristic}) + A12(X_{daily\ available\ accumulated\ light\ intensity}) + A13(X_{integrated\ moisture\ index})$", where A is constant, and A1, A2, A3, A4, A5, A6, A7, A8, A9, A10, A11, A12 and A13 are 13 relative relationship coefficients.

In addition, the method for quantifying plant resources using a GIS according to the present invention may further comprises a step for evaluating a reliability of the plant resource estimation distribution map and may still further comprises a step for computing an estimated value by adapting the unit price at a production site to the plant resource estimation value.

BRIEF DESCRIPTION OF THE DRAWINGS

The present invention will become better understood with reference to the accompanying drawings which are given only by way of illustration and thus are not limitative of the present invention, wherein.

BEST MODE FOR CARRYING OUT THE INVENTION

The method for quantifying plant resources using a GIS according to a preferred embodiment of the present invention will be described with reference to the accompanying drawings.

Figure 2:
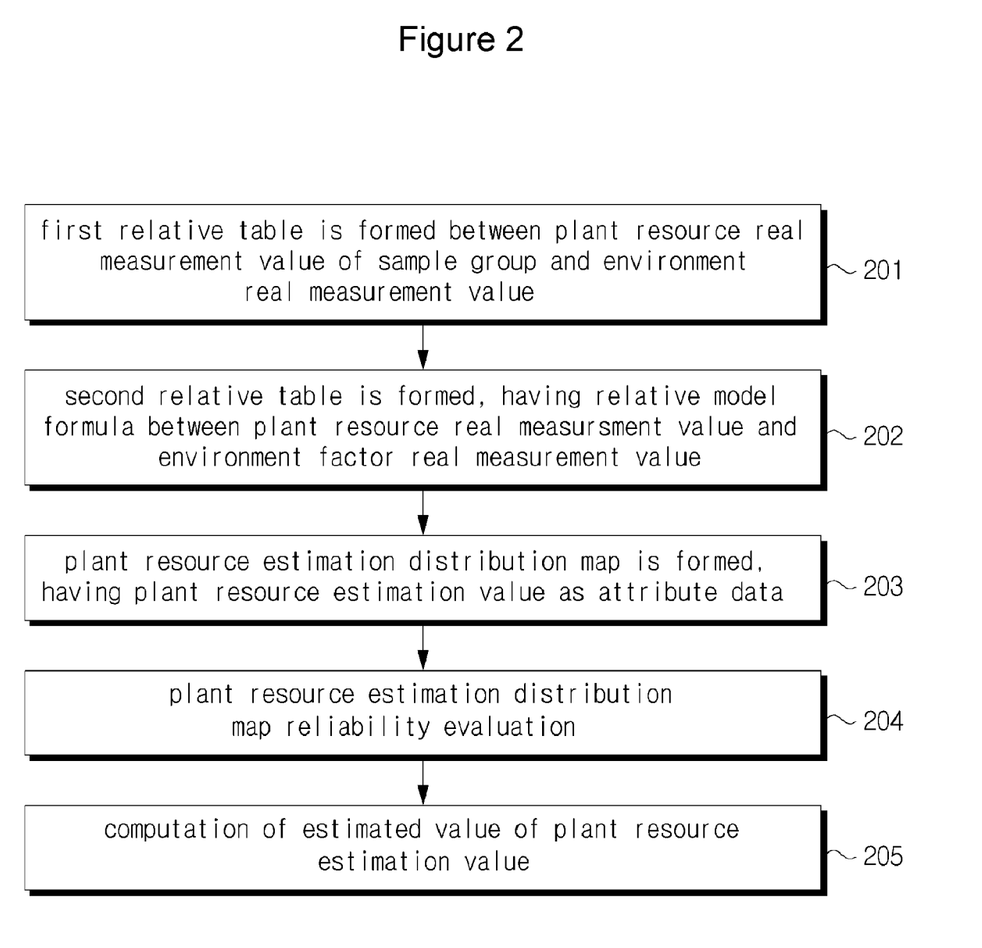
FIG. 2 is a schematic flow chart of an example of a method for quantifying plant resources using a GIS according to the present invention.

FIG. 2 is a schematic flow chart of an example of a method for quantifying plant resources using a GIS according to the present invention.

As shown in FIG. 2, the method for quantifying plant resources using a GIS according to an embodiment of the present invention comprises a first step 201 in which a sample group is extracted from a mother group, and a first relative table is formed between a plant resource real measurement value of the sample group and an environment factor real measurement value; a second step 202 in which a second relative table is made by extracting a relative model formula between a plant resource real measurement value and an environment factor real value by relating the first relative table using a certain statistic analysis program; and a third step 203 in which a plant resource estimation distribution map is formed by using a plant resource estimation value of the mother group as an attribute data by relating the second relative table with the distribution map of the mother group.

In the above embodiment of the present invention, there are further provided a fourth step 204 in which a reliability is evaluated by comparing the plant resource estimation distribution map with a plant resource real measurement distribution map having the previously known plant resource real measurement value as an attribute data, and a fifth step 205 in which an estimated value is computed by adapting the unit price of a corresponding region to the plant resource estimation value.

In more detail, in the first step 201, a plurality of distribution maps are formed based on various environment factors including an integrated moisture index by preprocessing the GIS having source material of a mother group. Here, the environment factors are 13 factors formed of altitude, azimuth and slope, which represent geographic factors; forest physiognomy, diameter class, age class and crown density which represent upper level plants; soil texture, site index and soil depth which represent soil factors; approaching characteristic which represents an artificial confusing factor; a daily available accumulated light intensity which represents a light factor; and an IMI.

The integrated moisture index represents an integrated moisture amount contained in a certain region. The integrated moisture index is preferably determined by four environment factors such as hill shade, flow accumulation, curvature and total available water-holding capacity.

Here, the hill shade is formed by a different light radiation due to a change of a slope angle, azimuth and position and a shade at a neighboring hilly district. In the present invention, a hill shade value is determined by classifying the shade degree when an artificial light is emitted when sun is positioned in a right south direction during summer solstice. So, the hill shade value has lowest values in the direction of SSW and has highest values in the direction of NNE.

Flow accumulation represents the flow of water. The bottom of the slope area has more moisture as compared to a ridgeline.

The curvature is obtained by measuring an outer look such as flat, concave and convex. The concave area has a higher curvature as compared to the convex area.

Total available water-holding capacity represents a moisture holding degree of soil and is obtained by quantifying the effective soil depth and soil drainage degree. For example, the total available water-holding capacity may be obtained by the following formula 1.

$$\text{Total available water-holding capacity}(t) = \text{effective soil depth} \times \text{water holding ratio} = \text{effective soil depth} \times (1/\text{soil drainage})$$  [Formula 1]

The GIS preprocess step comprises a digital geographic map preprocess step in which a plurality of distribution maps are formed, each having altitude, azimuth, slope, approaching characteristic, hill shade, flow accumulation and curvature as an attribute data using the attribute data of the digital geographic map which is obtained as a result of the NGIS project; a digital forest physiognomy map preprocess step in which a plurality of distribution maps are formed, each having forest physiognomy, diameter class, age class and crown density as an attribute data using the attribute data of the digital physiognomy map which is a result of the FGIS project, a forest site map preprocess step in which a plurality of distribution are formed, each having soil texture, site index, effective soil depth and total available water-holding capacity as an attribute data using the attribute data of a forest site map which is another result of the FGIS project, and a survey time-based summer solstice accumulated light intensity preprocess step in which one distribution map is obtained, which has a daily available accumulated light intensity as an attribute data.

The above digital geographic map preprocess step, digital forest physiognomy preprocess step and forest site map preprocess of the mother group will be described. First, the data of various subjects are classified into layers based on map pieces of reduced size 1:25,000, and the desired subjects and map piece-based layers of the position are extracted based on the attribute data of the GIS source materials which may be classified by the subjects. The extracted map pieces are connected on the drawings and are converted into a two-dimensional image and then are converted into a three-dimensional image. The above image is converted into a three-dimensional raster type formed of a plurality of grids each having a size of 20 m×20 m, so that a three-dimensional raster type geographic distribution map having a new subject is made. Here, the digital forest physiognomy map and forest site map belong to vector types having a polygon type material structure. Since each polygon structure is provided with various attribute data, it is separated and extracted by the single attribute data and is converted into a separate raster type material.

Figure 3:
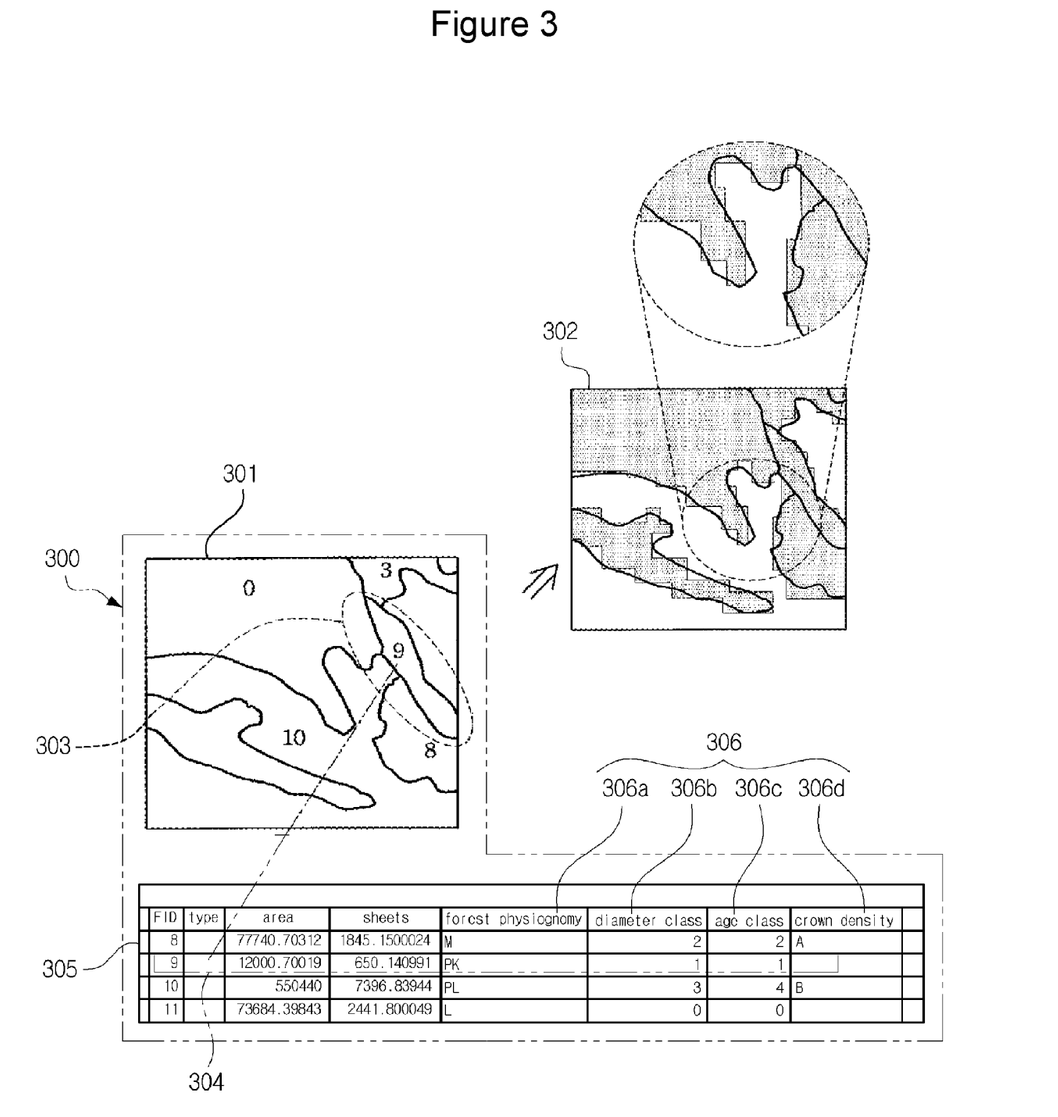
FIG. 3 is a plane view for describing a preprocess of a digital forest physiognomy map according to the present invention.

FIG. 3 is a plane view illustrating a digital forest physiognomy map preprocess according to the present invention, the digital forest physiognomy map preprocess method will be described with reference to the example of FIG. 3.

Here, the digital forest physiognomy map 300 is expressed with a vector type layer 301 and comprises a spatial data formed of a plurality of polygons 303, and an attribute item 306 which is formed of a forest physiognomy, a diameter class, an age class and a crown density based on the polygon 303. One polygon 303 of the spatial data is provided with an attribute table 305 which corresponds to an attribute data including a plurality of attribute items 306. As shown in the drawings, a ninth polygon 303 of the spatial data is matched with the number 9 of the FID of the mapped attribute item 306, and various attribute data 305 may be added to the same record 304 (line) in the attribute table by the user. The items of the attribute 305 representing the above attribute data will be described. One record 304 includes a forest physiognomy 306a(Sang), a diameter class 306b, an age class 306c and a crown density 306d(Mildo). The vector type layer 301 is converted into a raster type layer 302. Here, since the raster type layer 302 is provided with a material structure of capable of efficiently analyzing through various computations and conversions, a basic computation function may be provided together.

The method of computing IMI through the source material of the GIS using the preprocess will be described.

In the embodiment of the present invention, the IMI is computed based on hill shade, flow accumulation, curvature and total available water-holding capacity. Each attribute data value representing the hill shade, flow accumulation and curvature may be obtained through the preprocess of the digital geographic map which is a source material of the GIS, and the attribute data value representing the soil water holding capacity may be obtained through the preprocess of the forest site map which is a source material of the GIS.

Therefore, the IMI can be computed in such a manner that attribute data values corresponding to hill shade, flow accumulation, curvature and total available water-holding capacity with respect to the mother group of a certain region are obtained, and the moisture weighting values are applied to the above attribute data values, and the attribute data values added with the moisture weighting values are summed for thereby obtaining the IMI.

Therefore, the IMI may be computed based on the following formula 2.

$$IMI=(h \times 0.4)+(f \times 0.3)+(c \times 0.1)+(t \times 0.2),$$  [Formula 2]

where h represents hill shade value, f represents flow accumulation value, c represents curvature value and t represents total available water-holding capacity. The moisture weighting values applied to the attribute data values such as hill shade, flow accumulation, curvature and total available water-holding capacity directly adapt the above values cited in 1972 Landscape Ecology 12: 331-348, 1997.

The sample groups are selected from the mother group having a plurality of distribution maps.

which is performed with respect to a distribution characteristic based on an extraction of the sample group and 13 factors between extraction grid points, when the characteristics are not matched in the inter-characteristic comparison step 403, and a step in which a sample group is selected when the characteristics are matched.

In the selection step of the sample groups, a plurality of grid points are formed along the coordinates X and Y in the three dimensional raster type geographic distribution map, and a plurality of map piece sample groups are randomly selected. Here, the attribute data based on 13 factors of the sample group and the attribute data of the mother group are compared with respect to whether the extracted sample groups directly reflect the distribution characteristics of the mother group based on 13 factors, and the sample groups to which the characteristics of the mother group are applied are selected.

The corresponding site of the sample groups is directly surveyed, and the real measurement individual population values based on the species of plants with respect to each sample group and the real measurement growth values based on the species of plants, which are obtained by the corresponding site survey, are inputted in the format of excel having the field of 13 factors using the excel program, so that a first relative table is made.

The Table 1 shows the real measurement individual population value based on the species of plants and the growth measurement value based on the species of plants with respect to the real measurement values of 13 factors according to a certain survey. The growth measurement values represent the presence of the plants, so that it may have a value of 1 or 0, and the plants not shown in Table 1 have values of 0. The values of 13 factors including altitude, etc. may be expressed as a relative value in the sample group for a comparison. In Table 1, since the values represent the same region, the same values are given.

TABLE 1

| No. | SP | IP | AT | AZ | SL | FP | DC | AC | CD | LI | SI | ST | SD | IMI | AP |
|---|---|---|---|---|---|---|---|---|---|---|---|---|---|---|---|
| 6 | *Liriope spicata* | 10.31 | 2 | 1 | 2 | 0 | 3 | 4 | 3 | 7 | 0 | 1 | 20 | 6 | 2 |
| 21 | *Ligustrum japonicum* Thunb | 20.61 | 2 | 1 | 2 | 0 | 3 | 4 | 3 | 7 | 0 | 1 | 20 | 6 | 2 |
| 58 | *Carex siderosticta* | 51.53 | 2 | 1 | 2 | 0 | 3 | 4 | 3 | 7 | 0 | 1 | 20 | 6 | 2 |
| 76 | *Trachelospermum asiaticum* var. *intermedium* Nakai | 1236 | 2 | 1 | 2 | 0 | 3 | 4 | 3 | 7 | 0 | 1 | 20 | 6 | 2 |
| 106 | *Cymbidium goeringii* Reichb. fil. | 113.37 | 2 | 1 | 2 | 0 | 3 | 4 | 3 | 7 | 0 | 1 | 20 | 6 | 2 |
| 125 | *Isodon inflexus* (*Thunb.*) Kudo | 51.53 | 2 | 1 | 2 | 0 | 3 | 4 | 3 | 7 | 0 | 1 | 20 | 6 | 2 |
| 191 | *Oplismenus undulatifolius* (Ard.) Roem. et Schult. | 51.53 | 2 | 1 | 2 | 0 | 3 | 4 | 3 | 7 | 0 | 1 | 20 | 6 | 2 |
| 227 | *Pinus Thunbergii* | 5.15 | 2 | 1 | 2 | 0 | 3 | 4 | 3 | 7 | 0 | 1 | 20 | 6 | 2 |

(SP: species of plants, IP: Individual population, AT: altitude, AZ: azimuth, SL: slope, FP: Forest physiognomy, DC: Diameter class, AC: Age class, CD: Crown density, LI: Light intensity, SI: Site index, ST: Soil texture, SD: Soil depth, AP: approaching characteristic)

Figure 4:
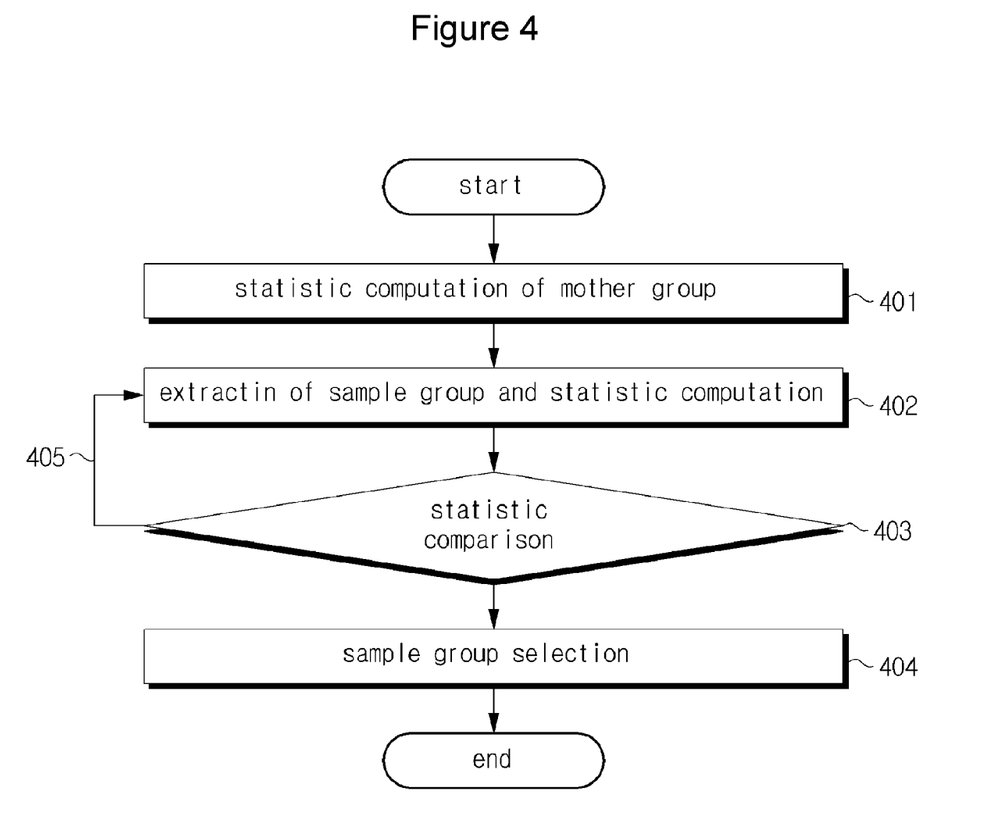
FIG. 4 is a schematic flow chart of a method for selecting a sample group according to an embodiment of the present invention.

FIG. 4 is a flow chart illustrating a method for selecting a sample group according to an embodiment of the present invention. As shown in FIG. 4, the method for selecting a sample comprises a statistic computation step 401 which is performed with respect to a distribution characteristic based on 13 factors of the mother group, a statistic computation step 402 which is performed with respect to a distribution characteristic based on an extraction of the sample group and 13 factors between extraction grid points, an inter-characteristic comparison step 403 in which an inter-characteristic is compared between the mother group and the sample group, a step 405 which is fed back to the statistic computation step 402, In the second step 202, an analysis between the plant resource real measurement value and the real measurement value of 13 factors is performed by relating the first relative table with a currently commercial regression analysis program, so that a relationship between the real measurement value of 13 factors and the plant resource real measurement value is obtained. So, it is possible to form a relative model formula between the estimated plant resource, namely, plant species-based estimated individual population value, the estimated growth value by the species of plants, and the real measurement value of 13 factors. Here, the dependent variables used for the regression analysis program are referred to a real measurement individual population value by the species of plants which are plant resources or a real measurement growth value by the species of plants. The independent variables are real measurement values of 13 factors which are environment factors. As a result of the relationship analysis between the real measurement values of 13 factors based on the species of plants before the above regression analysis, a certain relative relationship coefficient between the real measurement values of 13 factors is obtained based on the species of plants.

The relative relationship coefficients based on the environment factors with respect to various species of plants obtained using the regression analysis program and the relative model formula are applied to a second relative table using the excel program. For example, the relative model formula based on the real measurement values of 13 factors generated based on the estimated values of a result of the regression analysis with respect to *Trachelospermum asiaticum* var. intermedium Nakai in Weinaro island of Korea is shown in Formula 3.

$$Y = -172552.624 + 5576.409(X_{altitude}) - 2689.996(X_{azimuth\ north}) - 4400.893(X_{azimuth\ south\ west}) - 6908.361(X_{azimuth\ west}) - 4863.567(X_{forest\ physiognomy\ broad\ leaves}) + 26867.291(X_{daily\ available\ accumulated\ light\ intensity}) - 4209.804(X_{integrated\ moisture\ index}) + 2244.23(X_{diameter\ class})$$ [Formula 3]

In the formula 3, Y represents an estimated individual population value of *Trachelospermum asiaticum* var. intermedium Nakai, and the value X represents a real measurement value of 13 factors which is an attribute data of the sample group. Here, the azimuth, soil texture and forest physiognomy, which are not expressed in certain numbers among 13 factors of environment factors, may be classified as follows. For example, the azimuth in Weinaro island of Korea may be classified into north, north east, northwest, east, west, south east and south west. The soil texture may be classified into loamy soil, sand loamy soil and fine sand loamy soil. The forest physiognomy may be classified into needle leaves, broad leaves and mixed leaves. Therefore, when the azimuth factor is north among the environment factors at a certain grid point, the $X_{north}$ value is 1, and the $X_{azimuth\ south\ west}$ and $X_{azimuth\ west}$ values are both 0.

When the relative model formula like Formula 3 is obtained, a second relative table like the table 2 is obtained. The following second relative table shows an example of the relative model formula based on the real measurement values of 13 factors with respect to *Trachelospermum asiaticum* var. intermedium Nakai which is one of the species of plants.

through the GIS preprocess of the mother group with the second relative table.

Figure 5:
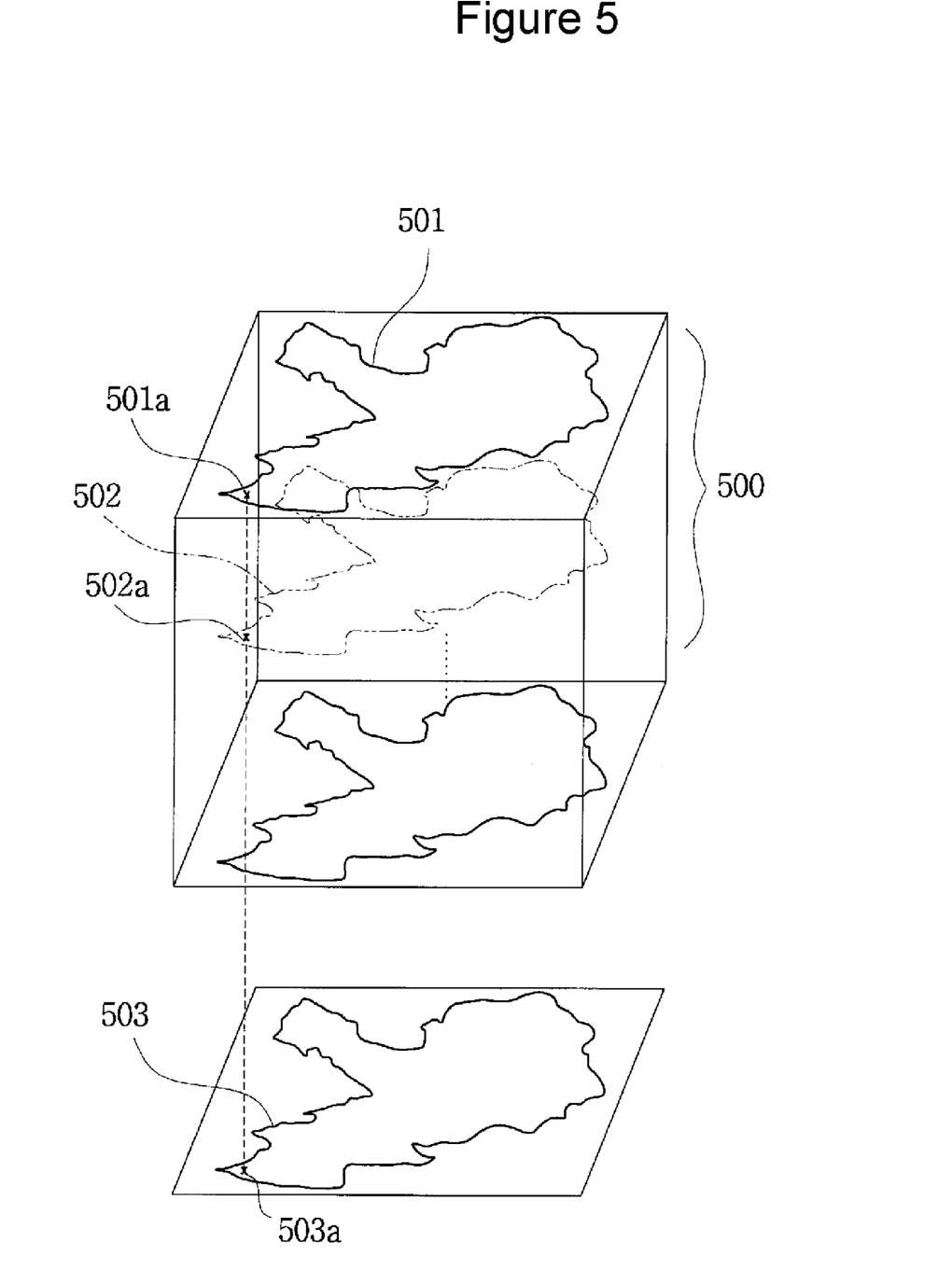
FIG. 5 is a perspective view illustrating part of a process for generating an estimated distribution map of plant resources of a mother group according to an embodiment of the present invention.

FIG. 5 is a perspective view illustrating part of a process for generating the plant resource estimation distribution map of the mother group.

The process for forming the plant resource estimation distribution map 503 based on the estimated individual population value with respect to one species of plant among the mother group will be described with reference to FIG. 5.

First, 13 distribution maps 500 based on 13 factors of the mother group are read, and 13 distribution maps 500 and the relationship model formula are related, so that the estimated individual population value based on the species of plants and the estimated growth value based on the species of plants are obtained with respect to all grid points corresponding to 13 distribution maps 500. So, the plant resource estimation distribution map 503 having the estimated individual population value and the estimated growth value as attribute data are obtained.

For example, the process for generating an estimated individual population value with respect to a certain plant of the third grid point 503a of the plant resource estimation distribution map 503 will be described. In the first distribution map 501 having an attribute data value with respect to one factor (environment factor) among 13 distribution maps 500 of the mother group, the attribute data value of the first grid point 501a positioned at the same place as the third grid point 503a of the plant resource estimation distribution map 503 is applied to the relative model formula, so that a first estimation individual population value based on a certain factor (environment factor) of the first grid point 501a is obtained. Here, the size of the grid point is 20 m×20 m.

The attribute data value of the second grid point 502a positioned at the same place of the third grid point 503a at another second distribution map 502 is applied to the relative model formula, so that a second estimation individual population value based on a certain factor of the second grid point 502a is generated.

In the above manners, the attribute data values of 13 distribution maps 500 are related with the relative model formula, so that 13 estimated individual population values with respect to a species of a certain plant corresponding to the same place are obtained with respect to 13 distribution maps 500. The above estimated individual population values are summed and generated as an estimated individual population value of a certain plant with respect to the third grid point 503a of the plant resource estimation distribution map 503.

The individual population values with respect a species of a certain plant generated at the grid points of the same places

TABLE 2

| No. | Name of plant | Altitude | ... | IMI | ... | Relative model formula |
|---|---|---|---|---|---|---|
| 76 | *Trachelospermum asiaticum* var. *intermedium* Nakai | −10.537 | ... | −19.7 | ... | Y = −172552.624 + 5576.409($X_{altitude}$) − 2689.996($X_{azimuth\ north}$) − 4400.893($X_{azimuth\ south\ west}$) − 6908.361 ($X_{azimuth\ west}$) − 4863.567($X_{forest\ physiognomy\ broad\ leaves}$) + 26867.291($X_{daily\ available\ accumulated\ light\ intensity}$) − 4209.804($X_{integrated\ moisture\ index}$) + 2244.23($X_{diameter\ class}$) |

In the third step 203, a plant resource estimation distribution map is formed based on the estimated individual population value by the species of plants of the mother group and the estimated growth value by the species of plants by relating the distribution map by each environment factor obtained are summed with respect to all grid points of 13 distribution maps 500 and are generated at an estimated individual population value with respect to a species of a certain plant of all grid points of the plant resource estimation distribution map 503. Here, since 13 distribution maps 500 are formed in a computable three dimensional raster structure, the distribution maps may be computable with each other.

In the present invention, it is possible to generate a plant resource estimation distribution map by quantifying all plant resources of a mother group by simply surveying the plant resource of the sample group extracted from the mother group so that a plurality of distribution maps based on 13 factors obtained through the preprocess with respect to the GIS of the mother group are adapted.

Next, in the fourth step 204, a reliability of the relative model formula with respect to whether the relative model formula, which generates a plant resource estimation distribution map having a plant resource as an attribute data, may be applied to a certain region or not is evaluated. So as to evaluate the relative model formula, an error ratio between the real measurement value and the estimated value of the plant resource with respect to a certain group is computed by comparing the plant resource real measurement value obtained through the plant resource survey of a certain group, not the mother group, with the plant resource estimation value of a certain group obtained by adapting the relative model formula. The computed error ratio is formed in the excel program format as shown in Table 3 for thereby forming a third relative table.

TABLE 3

| No. | Name of plant | Real measurement individual population value | Estimation individual population value | Error ratio (%) |
|---|---|---|---|---|
| 23 | Stephanandra incisa Zabel | 123 | 118 | 4.065041 |
| 58 | Carex siderosticta | 528 | 524 | 0.757576 |
| 76 | Trachelospermum asiaticum var. intermedium Nakai | 23421 | 24944 | 6.105677 |
| 100 | Trachelospermum asiaticum var. majus Ohwi | 307 | 303 | 1.302932 |
| 116 | Eurya japonica Thunb. | 496 | 484 | 2.419355 |
| 160 | Disporum smilacinum A. Gray. | 1930 | 1926 | 0.207254 |

As shown in Table 3, the relative model formula is overall reliable and has a high reliability.

Next, in the fifth step 205, the estimation value is computed by adapting the unit price of the production site to the plant resource estimation value. For example, Table 4 shows a plant resource estimation value of *Trachelospermum asiaticum* var. *intermedium* Nakai which is a species of the plants, namely, it shows an estimated value of the plant resource obtained by adapting 80 won as the price at the production site when the individual population is 86,968,294.

TABLE 4

| No. | Name of plant | Plant resource value | Unit price at production site | Estimated value |
|---|---|---|---|---|
| 76 | Trachelospermum asiaticum var. intermedium Nakai | 86,968,294 | 80 | 6,957,463,520 |

Accordingly, it is possible to obtain a plant resource estimation distribution map having a quantified plant resource so that a relative model formula between 13 factors and the plant resource using the GIS is obtained, and 13 factor values are respectively adapted to the relative model formula. In addition, it is possible to check in real time the changes of the plant resource at a certain region due to a natural disaster or an artificial reason by computing an estimation value based on the plant resource at a certain region.

INDUSTRIAL APPLICABILITY

As described above, in the present invention, it is possible to efficiently quantify and manage the plant resources of a certain region with less manpower, time and cost using the GIS. In addition, it is possible to correctly estimate a value of the plant resources, so that the present invention may be well adapted to the industry.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A method for quantifying a plant resource using a GIS (Geographic Information System), comprising:

a first step in which a sample group is extracted from mother groups having a plurality of distribution maps having a plurality of environment factors as attribute data, each environment factor including an IMI (Integrated Moisture Index) obtained through a GIS preprocess, so that a first relative table between a plant resource real measurement value of the sample group and an environment factor real measurement value is formed;

a second step in which a second relative table is formed for thereby obtaining a relative model formula between the plant resource real measurement value and the environment real measurement value with respect to a certain species of a plant by relating the first relative table with a statistic analysis program; and a third step in which a plant resource estimation distribution map of the mother group having a plant resource estimation value as an attribute data is formed by relating the second relative table with the distribution map of the mother group and overlapping the distribution maps, whereby the IMI is obtained through four factors as formed of Hillshade, Flow accumulation, Curvature, and available water-holding capacity indicating soil factor; the IMI is computed based on the following formula 1;

$IMI = (h \times W1) + (f \times W2) + (c \times W3) + (t \times W4)$ where h represents the value of hill shade, f represents the value of flow accumulation, c represents the value of curvature, t represents the value of total available water-holding capacity, W1 represents moisture weighting value with respect to the hill shade, W2 represents moisture weighting value with respect to flow accumulation, W3 represents moisture weighting value with respect to curvature, and W4 represents moisture weighting value with respect to total available water-holding capacity.

2. The method of claim 1, wherein said distribution maps are formed in three dimensional raster types so that they can be computed with each other through an overlapping.

3. The method of claim 1, wherein in addition to the IMI, said environment factors are further formed of altitude, azimuth and slope, which represent geographic factors; forest physiognomy, diameter class, age class and crown density which represent species (forest physiognomy) of upper level plants; soil texture, site index and soil depth which represent soil factors; approaching characteristic which represents an artificial confusing factor; and a daily available accumulated light intensity which represents a light factor.

4. The method of claim 1, wherein said available water-holding capacity (t) is obtained by the following formula 1; available water-holding capacity(t)=effective soil depth.times.(1/soil drainage) [Formula 1].

5. The method of claim 1, wherein said GIS preprocess step comprises:
- a digital geographic map preprocess step in which a plurality of distribution maps are formed, each map having altitude, azimuth, slope, approaching characteristic, hill shade, flow accumulation and curvature as an attribute data;
- a digital forest physiognomy map preprocess step in which a plurality of distribution maps are formed, each map having forest physiognomy, diameter class, age class and crown density as an attribute data;
- a forest site map preprocess step in which a plurality of distribution are formed, each map having soil texture, site index, effective soil depth and total available water-holding capacity as an attribute data; and
- a survey time-based summer solstice accumulated light intensity preprocess step in which one distribution map is obtained, which has a daily available accumulated light intensity as an attribute data.

6. The method of claim 1, wherein said plant resource corresponds to a plant species-based individual population and a plant species-based growth.

7. The method of claim 1, wherein in said first step, the first relative table is formed by inputting a plant resource real measurement value of the sample group obtained through a corresponding site survey and an environment factor real measurement value.

8. The method of claim 1, wherein in said second step, a relative model formula is obtained for determining a plant resource estimation value based on the environment factor real measurement value using a logistic regression analysis program with a statistic analysis program, and a result of the above process allows a second relative table to be formed.

9. The method of claim 8, wherein said relative model formula is obtained in such a manner that an analysis between the environment real measurement values is performed based on the logistic regression analysis program, and 13 relative relationship coefficients representing a relative relationship with respect a species of one plant between 13 factors are obtained, and 13 relative relationship coefficients are adapted to the relative model formula through an analysis between the environment factor real measurement value and the plant resource real measurement value.

10. The method of claim 9, wherein said relative model formula is expressed in the following formula 3;

$$Y = A + A1(X_{\text{altitude}}) + A2(X_{\text{azimuth}}) + A3(X_{\text{slope}}) + A4(X_{\text{forest physiognomy}}) + A5(X_{\text{diameter class}}) + A6(X_{\text{age class}}) + A7(X_{\text{crown density}}) + A8(X_{\text{soil texture}}) + A9(X_{\text{soil site}}) + A10(X_{\text{effective soil depth}}) + A11(X_{\text{approaching characteristic}}) + A12(X_{\text{daily available accumulated light intensity}}) + A13(X_{\text{integrated moisture index}}),$$ [Formula 3]

where A is constant, and A1, A2, A3, A4, A5, A6, A7, A8, A9, A10, A11, A12 and A13 are 13 relative relationship coefficients.

11. The method of claim 1, further comprising a step for evaluating a reliability of the plant resource estimation distribution map.

12. The method of claim 1, further comprising a step for computing an estimated value by adapting the unit price at a production site to the plant resource estimation value.

13. A method for quantifying a plant resource using a GIS (Geographic Information System), comprising:
- a first step in which a sample group is extracted from mother groups stored in a GIS having a plurality of distribution maps having a plurality of environment factors as attribute data, each environment factor including an IMI (Integrated Moisture Index) obtained through a GIS preprocess executed by the GIS, so that a first relative table between a plant resource real measurement value of the sample group and an environment factor real measurement value is formed and stored by the GIS;
- a second step in which a second relative table is formed and stored by the GIS for thereby obtaining a relative model formula between the plant resource real measurement value and the environment real measurement value with respect to a certain species of a plant by relating the first relative table with a statistic analysis program executed by the GIS; and
- a third step in which a plant resource estimation distribution map of the mother group having a plant resource estimation value as an attribute data is formed by relating the second relative table with the distribution map of the mother group and overlapping the distribution maps and the formed plant resource estimation distribution map is stored by the GIS, whereby the IMI is obtained through four factors as formed of Hillshade, Flow accumulation, Curvature, and available water-holding capacity indicating soil factor.

* * * * *